UNITED STATES PATENT OFFICE.

N. GRAY BARTLETT, OF CHICAGO, ILLINOIS.

FIRE-EXTINGUISHING COMPOUND.

SPECIFICATION forming part of Letters Patent No. 300,190, dated June 10, 1884.

Application filed December 19, 1883. (No specimens.)

*To all whom it may concern:*

Be it known that I, N. GRAY BARTLETT, a resident of Chicago, county of Cook, and State of Illinois, have invented certain new and useful Improvements in Fire-Extinguishing Compounds, of which the following is hereby declared to be a full, clear, and exact description, sufficient to enable others skilled in the art to which said invention appertains to make and use the same.

My invention relates more especially to fire-extinguishing compounds which can be advantageously charged into tight bomb-like vessels or hand-grenades, as proposed in Letters Patent No. 117,891, Johnson, August 8, 1871, and No. 282,981, Harden, August 14, 1883. In said patents the preferred fire-extinguishing material consists of an aqueous solution of carbonic-acid gas retained under pressure within the vessel, and capable of instant use the moment the vessel is broken. The gas was developed by adding a suitable quantity of carbonate salt to the water and free hydrochloric, sulphuric, or other like acid contained within the vessel, after which the mouth of the grenade was quickly closed and sealed. If for any reason the sealing were or became defective, or the vessel were slightly cracked, the free carbonic-acid gas existing under high tension would find a vent and the grenade have its fire-extinguishing qualities very materially lessened, and, indeed, be well-nigh valueless. My invention is designed to offset this source of loss by providing a fire-extinguishing compound which when charged into the grenades will not only develop the free carbonic-acid gas usual thereto, but will supplement the same by a large additional quantity that remains in combined state at ordinary temperatures, but becomes immediately available when the grenade is broken in the fire. This additional volume of carbonic-acid gas could not possibly exist in free state in the grenade under ordinary conditions, since it must inevitably burst the vessel; but by being kept in combined state, as proposed, it is plain that the grenades containing my improved compound retain their efficiency when applied to a fire, even though there be no free carbonic-acid gas generated in this bomb when first made or where this has found premature ventage, as hereinbefore described. The compound is also rendered anti-freezing in quality, so that the grenades can be exposed to a very low degree of cold ($-15°$ Fahrenheit) without injury or breakage of the bomb, due to congelation of the liquid.

In the preparation of the compound the process is as follows: To two hundred gallons of cold water are added four hundred pounds of sodic chloride and two hundred pounds of ammonia chloride, and when solution is effected one hundred and fifty-six pounds of muriatic acid, ($18°$.) Carbonate of potassa is now gradually stirred into the solution in quantity sufficient to exactly neutralize the free muriatic acid, (about one hundred and five pounds will be required,) the stirring being repeated with each fresh addition of the potassic carbonate. The operation should be conducted in the open air or in connection with a ventilating arrangement capable of carrying off the excess of carbonic-acid gas, which is copiously evolved. When the necessary quantity of potassic carbonate has been used, there is added to the liquid seventy-five pounds of bicarbonate of soda, and stirring is resumed until solution is effected. The liquid is now ready for use, and it should be placed in the containing-vessels as soon as practicable. When charged into the grenade, the free carbonic acid, if any is desired to be developed therein, may be conveniently produced by adding to the liquid, just prior to the hermetical closing of the vessel, an appropriate quantity of some acid, by preference generally tartaric acid, as being in a solid and therefore convenient condition for use, the quantity of the acid addition being varied to secure any desired degree of pressure within the containing-vessel, though if any high degree is requisite there should be a corresponding increase in the amount of sodic bicarbonate prescribed.

The compound thus prepared derives its anti-freezing qualities from the presence of the chloride of sodium, potassium, and ammonium combined in such proportions as to saturate the solution at the low temperature which it is to withstand ($-15°$ Fahrenheit) without freezing. The chloride of potassium is not introduced into the solution in the solid state as such, but is formed directly therein by the reaction of the hydrochloric acid upon the potassic carbonate. Aside from the advantage, commercially speaking, in way of economy, another very important benefit results from this mode of preparing the potassic chloride. At the stage in the process where the potassic carbonate is added the chlorides of sodium and ammonium have already been dissolved, and by their admixture have produced a very low degree of temperature in the liquid, (about 35° Fahrenheit.) In this condition much of the free carbonic acid evolved by decomposition of the potassic carbonate is absorbed and retained in solution, which at higher temperature would pass off and be lost. By reason, therefore, of the absorptive capacity of the cold liquid, it becomes approximately saturated with free carbonic-acid gas, so that upon being charged into the grenade but little tartaric or other acid addition is necessary to develop a pressure of several atmospheres therein, or, in other words, to charge the grenade with as much free carbonic-acid gas as it can safely withstand. Economy in the acid addition and in the quantity of bicarbonate of soda needed is thus insured.

The fire-extinguishing qualities of the compound prepared as hereinbefore described in excess of those possessed by an equal quantity of water are due, first, to the presence of free carbonic-acid gas, and, second, to what has been termed the "combined carbonic-acid gas," or, in other words, to the presence of alkaline bicarbonate, (sodic,) which has remained undecomposed by reason of the comparatively slight addition of tartaric or equivalent acid made just prior to the sealing of the grenades. The alkaline bicarbonates possess the property of parting with a portion of their carbonic-acid gas when their watery solutions are heated, and even before the boiling-point of water is reached. Hence when the liquid containing said bicarbonates is thrown upon a burning body the liquid becomes heated and the carbonic-acid gas is evolved in direct contact with the fire, contributing very efficiently to its suppression. Again, the chloride of ammonium, designed, primarily, as an antifreezing ingredient, is a salt which at a temperature of about 660° Fahrenheit passes into vapor. This salt being dried out in contact with the heated surface, and passing almost immediately thereafter into a vaporous condition, renders latent in the vapor an enormous amount of sensible heat; or, in other words, acts thereby to rapidly cool down the inflamed body. In addition to this very useful cooling property c  the ammonium salt when passing into a vaporous condition, the vapor itself, of which several gallons are evolved from each pint of liquid containing said salt, as prescribed, surrounds the burning body, and by excluding an equal volume of air so far reduces the intensity of the combustion. The sodic and potassic chlorides, on drying out of the solution in contact with the fire, become fused, and by surface-coating the material exclude the air and likewise act to check the fire.

While the proportions of the several ingredients hereinbefore specified may be varied without materially affecting the scope of the invention, it is believed that the best results are attained by adhering to the formula and mode of preparation stated. An obvious substitution would seem to be in the addition of ammoniac or potassic bicarbonate, or both, to the quantity of sodic bicarbonate, so that the solution would become saturated with these salts as well, and the quantity of carbonic-acid gas in latent condition be correspondingly increased. The effect, however, of any such addition in strong solution of sodic chloride and free carbonic acid would be to convert the ammoniac or potassic bicarbonates into chlorides and to produce an additional quantity of sodic bicarbonate, so that it were better to add this latter salt, as such, at the outset if any supersaturation of the liquid with latent carbonic-acid gas is desired.

Having thus described the invention, what I claim as new, and desire to secure by Letters Patent, is—

1. A fire-extinguishing grenade hermetically sealed and containing free carbonic-acid gas and a salt of carbonic acid in solution therein, substantially as set forth.

2. A fire-extinguishing grenade hermetically sealed and containing a salt of carbonic acid in a solution adapted to remain liquid at a temperature about or below zero Fahrenheit, substantially as set forth.

3. A fire-extinguishing grenade hermetically sealed and containing the alkaline chlorides and an alkaline carbonate in solution therein, substantially as set forth.

4. A fire-extinguishing grenade hermetically sealed containing free carbonic-acid gas, together with the alkaline chlorides, and an alkaline carbonate in solution therein, substantially as described.

N. GRAY BARTLETT.

Witnesses:
JAMES H. PEIRCE,
WM. H. DYRENFORTH.